United States Patent
Shimamoto et al.

(10) Patent No.: US 12,226,914 B2
(45) Date of Patent: Feb. 18, 2025

(54) GENERATION OF IMAGE FOR ROBOT OPERATION

(71) Applicant: KABUSHIKI KAISHA YASKAWA DENKI, Kitakyushu (JP)

(72) Inventors: Keita Shimamoto, Fukuoka (JP); Koji Sokabe, Fukuoka (JP); Ryokichi Hirata, Fukuoka (JP); Masaru Adachi, Fukuoka (JP)

( * ) Notice: Subject to any disclaimer, the term of this patent is extended or adjusted under 35 U.S.C. 154(b) by 286 days.

(21) Appl. No.: 17/932,298

(22) Filed: Sep. 15, 2022

(65) Prior Publication Data

US 2023/0010302 A1 Jan. 12, 2023

Related U.S. Application Data

(63) Continuation of application No. PCT/JP2020/014223, filed on Mar. 27, 2020.

(51) Int. Cl.
*B25J 9/16* (2006.01)
*B25J 13/08* (2006.01)
*B25J 19/02* (2006.01)
*G06V 20/40* (2022.01)

(52) U.S. Cl.
CPC .......... *B25J 9/1689* (2013.01); *B25J 9/1653* (2013.01); *B25J 9/1697* (2013.01); *B25J 13/089* (2013.01); *B25J 19/023* (2013.01); *G06V 20/46* (2022.01)

(58) Field of Classification Search
CPC ...... B25J 9/1689; B25J 9/1653; B25J 9/1697; B25J 13/089; B25J 19/023; G06V 20/46; G06V 10/245; G05B 2219/40151
See application file for complete search history.

(56) References Cited

U.S. PATENT DOCUMENTS

| | | | | |
|---|---|---|---|---|
| 9,919,427 | B1* | 3/2018 | Guilbert | B25J 9/1664 |
| 11,027,430 | B2* | 6/2021 | Thackston | B25J 9/1689 |
| 11,249,474 | B2* | 2/2022 | Magzimof | G05D 1/0214 |
| 2011/0087371 | A1* | 4/2011 | Sandberg | G05D 1/0038 |
| | | | | 701/2 |
| 2013/0308827 | A1* | 11/2013 | Dillavou | G06T 11/00 |
| | | | | 382/107 |

(Continued)

FOREIGN PATENT DOCUMENTS

| | | |
|---|---|---|
| JP | H9-103978 | 4/1997 |
| JP | 2005-161498 | 6/2005 |

(Continued)

OTHER PUBLICATIONS

Translation of JP-2012033038-A (Year: 2012).*

(Continued)

*Primary Examiner* — Adam R Mott
*Assistant Examiner* — James Miller Watts, III
(74) *Attorney, Agent, or Firm* — SOEI PATENT & LAW FIRM

(57) ABSTRACT

A robot control system includes circuitry configured to: generate a command to a robot; receive a frame image in which a capture position changes according to a motion of the robot based on the command; extract a partial region from the frame image according to the command; superimpose a delay mark on the partial region to generate an operation image; and display the operation image on a display device, so as to represent a delay of the motion of the robot with respect to the command.

20 Claims, 8 Drawing Sheets

(56) References Cited

U.S. PATENT DOCUMENTS

| | | | |
|---|---|---|---|
| 2014/0067317 A1* | 3/2014 | Kobayashi | G05D 3/00 |
| | | | 702/153 |
| 2014/0085459 A1* | 3/2014 | Blanton | H04N 17/04 |
| | | | 348/135 |
| 2015/0057801 A1 | 2/2015 | Stephens, Jr. | |
| 2015/0151431 A1 | 6/2015 | Suyama et al. | |
| 2019/0143525 A1* | 5/2019 | Ishihara | G05B 19/00 |
| | | | 700/59 |

FOREIGN PATENT DOCUMENTS

| | | | |
|---|---|---|---|
| JP | 2006-000977 | | 1/2006 |
| JP | 2012-033038 | | 2/2012 |
| JP | 2012033038 A | * | 2/2012 |
| JP | 2015-047666 | | 3/2015 |
| WO | 2014/013605 | | 1/2014 |

OTHER PUBLICATIONS

International Preliminary Report on Patentability with Written Opinion dated Oct. 6, 2022 for PCT/JP2020/014223.
International Search Report dated Jun. 23, 2020 for PCT/JP2020/014223.

* cited by examiner

GENERATION OF IMAGE FOR ROBOT OPERATION

CROSS-REFERENCE TO RELATED APPLICATIONS

This application is a continuation application of PCT Application No. PCT/JP2020/014223, filed on Mar. 27, 2020, the entire contents of which are incorporated herein by reference.

BACKGROUND

Japanese Patent Publication No. 2015-47666 A describes a remote operating device that transmits an operation command to a slave robot and receives an actual image captured by the slave robot during an operation.

SUMMARY

A robot control system according to an aspect of the present disclosure includes circuitry configured to: generate a command to a robot; receive a frame image in which a capture position changes according to a motion of the robot based on the command; extract a partial region from the frame image according to the command; superimpose a delay mark on the partial region to generate an operation image; and display the operation image on a display device, so as to represent a delay of the motion of the robot with respect to the command.

A robot control method according to an aspect of the present disclosure is executable by a robot control system including at least one processor. The method includes: generating a command to a robot; receiving a frame image in which a capture position changes according to a motion of the robot based on the command; extracting a partial region from the frame image according to the command; superimposing a delay mark on the partial region to generate an operation image; and displaying the operation image on a display device, so as to represent a delay of the motion of the robot with respect to the command.

A non-transitory computer-readable storage medium according to an aspect of the present disclosure stores processor-executable instructions to: generate a command to a robot; receive a frame image in which a capture position changes according to a motion of the robot based on the command; extract a partial region from the frame image according to the command; superimpose a delay mark on the partial region to generate an operation image; and display the operation image on a display device, so as to represent a delay of the motion of the robot with respect to the command.

DETAILED DESCRIPTION

In the following description, with reference to the drawings, the same reference numbers are assigned to the same components or to similar components having the same function, and overlapping description is omitted.

Configuration of System

A robot control system 1 according to some examples is a computer system that assists an operation (or manipulation) of a robot 2 by a user. The robot 2 operates based on the operation to perform various works such as machining and assembly. "To assist the operation of the robot" refers to providing the user with an environment to operate the robot 2 easily. The user refers to a person who operates the robot, and therefore can also be referred to as an operator.

Figure 1:
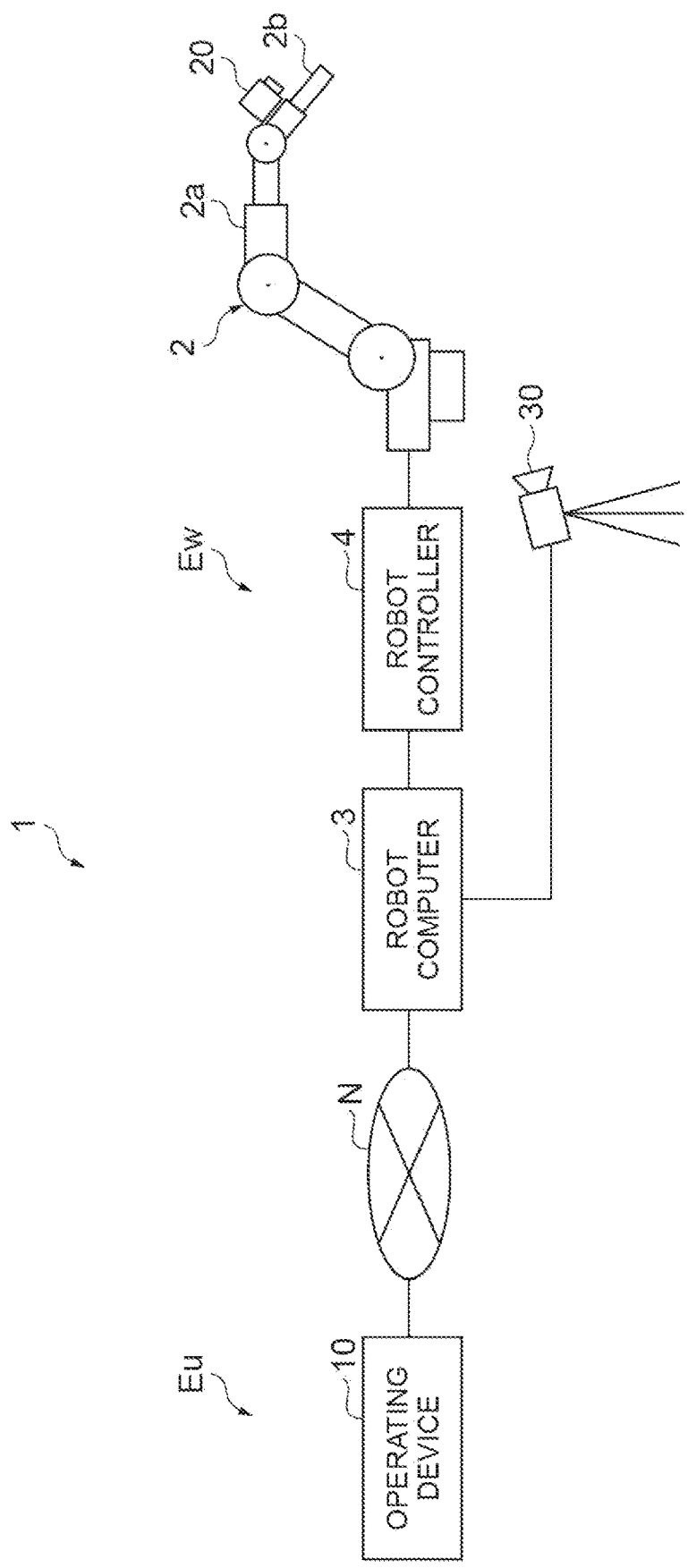
FIG. 1 is a diagram showing an example application of a robot control system.

FIG. 1 is a diagram showing an example application of the robot control system 1. In some examples, the robot control system 1 comprises an operating device 10. The operating device 10 is connected to a robot computer 3 via a communication network N. The robot computer 3 is connected to a robot controller 4, and the robot controller 4 is connected to the robot 2.

FIG. 1 shows one operating device 10 and one robot 2. Two or more operating devices 10 or two or more robots 2 may exist.

In some examples, the operating device 10 is located in an operating environment Eu where the user is present, while the robot computer 3, the robot controller 4, and the robot 2 are located in a work environment Ew that is remotely located to the user. That is, the work environment Ew is a remote environment when viewed from the operating environment Eu. The fact that an object is "remotely located" refers to the fact that the object is present at a position where the user cannot see the object with his/her own eyes. A distance between the operating environment Eu and the work environment Ew, that is, the distance between the user and the robot 2 are not limited. For example, the work environment Ew may be away from the operating environment Eu on the order of kilometers. Alternatively, the work environment Ew may be away from the operating environment Eu on the order of several meters, for example a space next to a room that is the operating environment Eu may be the work environment Ew.

Corresponding to the fact that the distance between the operating environment Eu and the work environment Ew are not limited, the configuration of the communication network N is also not limited. For example, the communication network N may include at least one of the Internet and an intranet. Alternatively, the communication network N may have a simple configuration realized by one communication cable.

In a case where the user operates the work environment Ew while viewing an image of the robot 2, a delay may occur between the user operation and a motion of the robot 2 shown in the image. That is, there is a possibility that the motion of the robot 2 corresponding to the user operation is reflected in the image slightly later than the user operation. In some examples, the delay may occur between a command to the robot 2 by the user operation and the motion of the robot 2 shown in the image. In the present disclosure, the delay refers to the fact that a motion of the robot 2 shown in an image is delayed with respect to a command to the robot 2.

In some examples, the delay occurs in transmissions of commands and responses over the communication network. For example, even if the user inputs a command using the operating device 10 at hand, a certain communication time is required until the command is transmitted to the robot 2. Further, it takes a certain communication time until information on a response of the robot 2 to the command is transmitted from the work environment Ew to the operating device 10. The user cannot therefore immediately see the response to the command. The robot control system 1 absorbs or reduces the delay to allow the user to intuitively grasp the motion of the robot in real time. Here, the command refers to an instruction input by a user operation. The response refers to an output to the command. In some examples, the response may be information indicating the motion (position or posture) of the robot 2, or may be indicated by a command output from the robot controller 4 to the robot 2.

In some examples, an effect of the delay appears as a difference between an integral value of values related to the command and an integral value of values related to the response. The value related to the command is, for example, a value regarding an additional movement vector corresponding to the user operation, that is, a value indicating an amount of movement or a movement speed and a movement direction. The value related to the response is, for example, a value related to an additional movement vector indicating an additional motion of the robot, that is, a value indicating an amount of movement or a movement speed and a movement direction. In the present disclosure, the value related to the command is also simply referred to as a "command value", and the value related to the response is also simply referred to as a "response value".

The operating device 10 is a computer for operating the robot 2. The operating device 10 includes a manipulation interface that is an input interface for operating the robot 2 and a monitor capable of displaying images representing the work environment Ew. The user can operate the robot 2 with the manipulation interface while checking the work environment Ew displayed on the monitor. The operating device 10 transmits a command value indicating a user operation (or command) input from the manipulation interface to the robot computer 3.

The robot computer 3 is a computer that interprets the command value input from the operating device 10 and outputs a command signal corresponding to the command value to the robot controller 4.

The robot controller 4 is a device that controls the robot 2 according to the command signal input from the robot computer 3. In some examples, the robot controller 4 controls the robot 2 based on the command transmitted from the operating device 10 in response to the user operation. In some examples, the command signal includes data for controlling the robot 2, for example, a path indicating a trajectory of the robot 2. The trajectory of the robot 2 refers to a course of motion of the robot 2 or a component thereof. For example, the trajectory of the robot 2 may be a trajectory of the tip portion of the robot 2. In some examples, the robot controller 4 calculates a joint angle target value (angle target value of each joint of the robot 2) for matching the position and posture of the tip portion to a target value indicated by the command signal, and controls the robot 2 in accordance with the angle target value.

The robot 2 is a device or machine that works on behalf of a person. In some examples, the robot 2 is vertical articulated robot of a multi-axis serial link type. The robot 2 includes a manipulator 2a and an end effector 2b which is a tool attached to the tip of the manipulator 2a. The robot 2 is capable of executing various processes with the end effector 2b. The robot 2 is capable of freely changing the position and posture of the end effector 2b within a predetermined range. The robot 2 may be a six-axis vertical articulated robot, or a seven-axis vertical articulated robot in which one redundant axis is added to six axes.

The motion of the robot 2 is recorded as a response of the robot 2 by various sensors mounted on the robot 2, and is output to, for example, the robot controller 4, as sensor data. The robot controller 4 calculates a response value indicating the motion (response) of the robot 2 based on the sensor data, and transmits the response value to the operating device 10 via the robot computer 3. Alternatively, the robot controller 4 may transmit a command signal to the robot 2 as a response value to the operating device 10 via the robot computer 3. At least some of the sensor data from the sensor of the robot 2 may be output to the robot computer 3 without passing through the robot controller 4. In this case, the robot computer 3 may calculate the response value based on the sensor data.

In some examples, a hand camera (first camera) 20 and a bird's eye view camera (second camera) 30 are provided in the work environment Ew. The hand camera 20 is an imaging device mounted on the robot 2 (for example, at the tip portion of the robot 2). Therefore, at least one of the position and posture of the hand camera 20 changes in accordance with the motion of the robot 2. The hand camera 20 may capture the end effector 2b or its surrounding environment. On the other hand, the bird's eye view camera 30 is an imaging device installed so as to take a position and posture independent of the motion of the robot 2. The bird's eye view camera 30 is not attached to the robot 2 but is set in a place (for example, a wall surface, a roof, a camera stand, or the like) that is not affected by the motion of the robot 2. The bird's eye view camera 30 captures the work environment Ew, for example, captures at least a part of the robot 2. In some examples, each of the hand camera 20 and the bird's eye view camera 30 outputs a frame image generated by imaging to the robot computer 3, and the robot computer 3 transmits the frame image to the operating device 10. The frame image refers to each of still images constituting a moving image (video), and is generated by an imaging device such as a camera. In the present disclosure, the frame image generated by the hand camera 20 is also referred to as a "first frame image", and the frame image generated by the bird's eye view camera 30 is also referred to as a "second frame image".

The computer functioning as the operating device 10 or the robot computer 3 may be a personal computer, or a large computer such as a business server.

Figure 2:
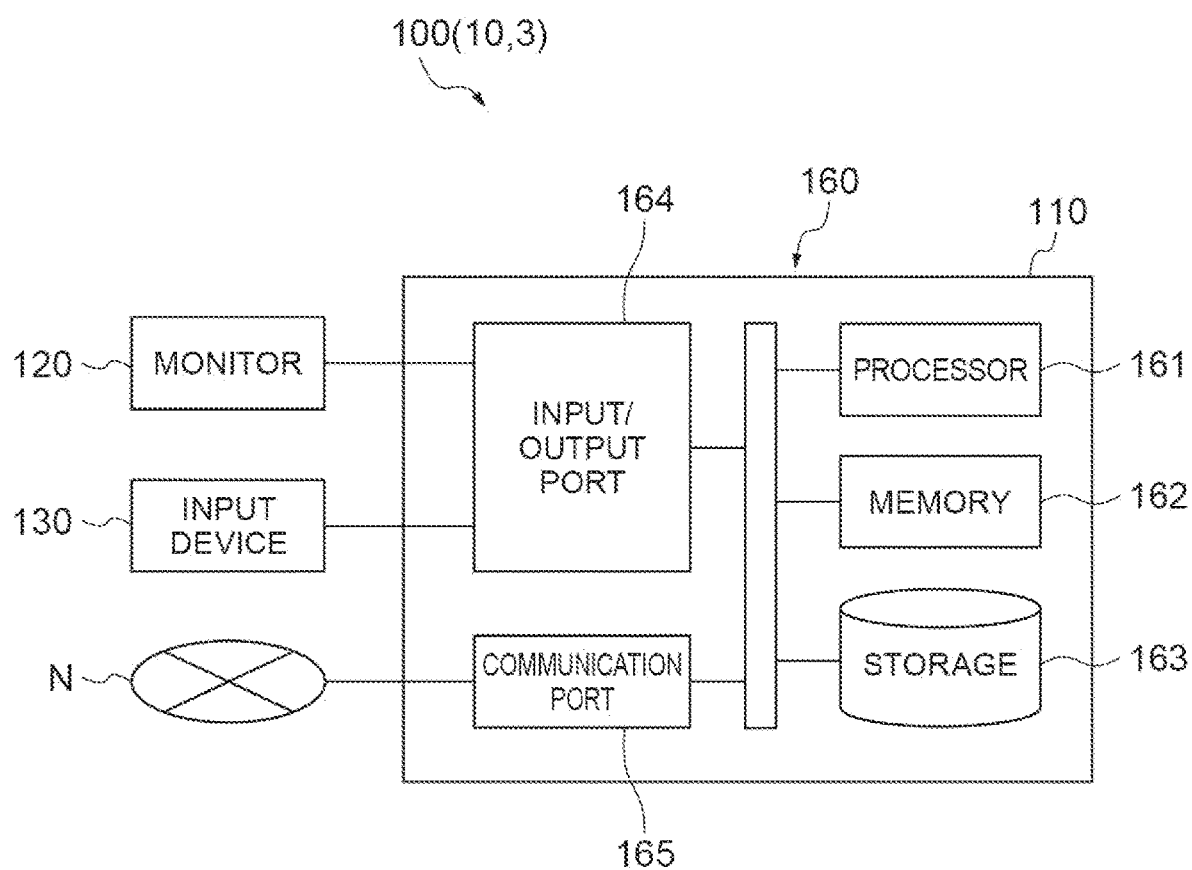
FIG. 2 is a diagram showing an example hardware configuration used for the robot control system.

FIG. 2 is a diagram showing an example hardware configuration of a computer 100 used for the operating device 10 or the robot computer 3. In this example, the computer 100 comprises a main body 110, a monitor 120, and an input device 130.

The main body 110 is realized by at least one computer. The main body 110 includes circuitry 160, and the circuitry 160 includes at least one a processor 161, a memory 162, a storage 163, an input/output port 164, and a communication port 165. The storage 163 stores a program for configuring each functional module of the main body 110. The storage 163 is a computer-readable storage medium such as a hard disk, a nonvolatile semiconductor memory, a magnetic disk, or an optical disk. The memory 162 temporarily stores a program loaded from the storage 163, a calculation result of the processor 161, and the like. The processor 161 executes the program in cooperation with the memory 162 to configure each functional module. The input/output port 164 inputs and outputs electric signals to and from the monitor 120 or the input device 130 in response to commands from the processor 161. The input/output port 164 may input and output electric signals to and from another device such as the robot controller 4. The communication port 165 performs data communication with another apparatus via the communication network N in accordance with commands from the processor 161.

The monitor 120 is a device for displaying information output from the main body 110. The monitor 120 is an example of a display unit (or display device) in the present disclosure. The monitor 120 may be any unit as long as graphic display is possible, and examples thereof include a liquid crystal panel. The input device 130 is a device for inputting information to the main body 110. The input device 130 may be any unit as long as desired information can be input, and examples thereof include manipulation interfaces such as a keypad, a mouse, and an manipulation controller.

The monitor 120 and the input device 130 may be integrated as a touch panel. For example, the main body 110, the monitor 120, and the input device 130 may be integrated like a tablet computer.

Figure 3:
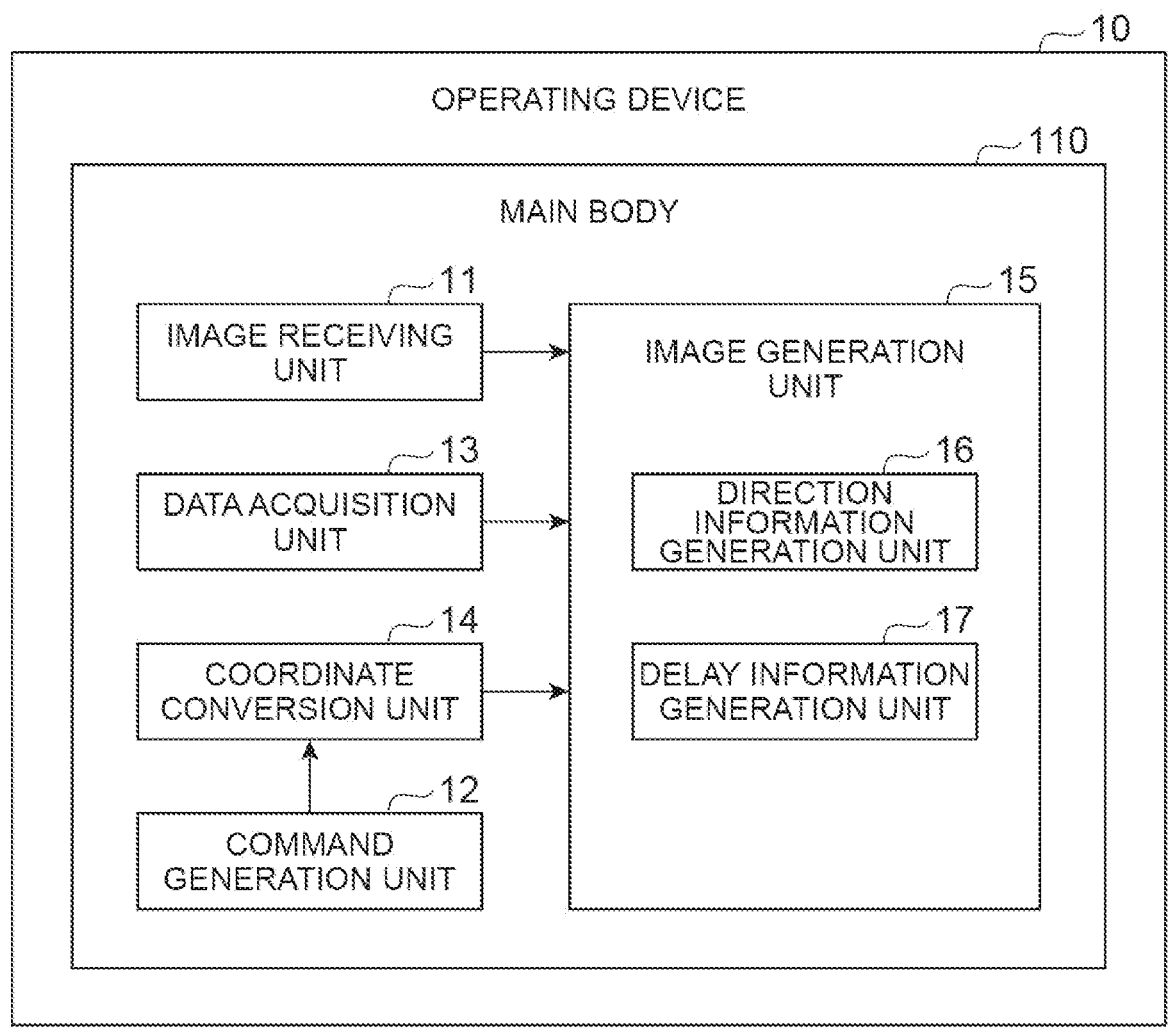
FIG. 3 is a diagram showing an example functional configuration of an operating device.

FIG. 3 is a diagram showing an example functional configuration of the operating device 10. In some examples, the operating device 10 includes an image receiving unit 11, a command generation unit 12, a data acquisition unit 13, a coordinate conversion unit 14, and an image generation unit 15 as functional modules. The image receiving unit 11 is a functional module that receives a frame image from the work environment Ew. The command generation unit 12 is a functional module that generates a command (command value) to the robot 2 according to an input from the manipulation interface. The data acquisition unit 13 is a functional module that acquires data related to the manipulation or motion of the robot 2 from the operating environment Eu or the work environment Ew. For example, the data acquisition unit 13 acquires a command value and a response value. A coordinate conversion unit 14 is a functional module that performs coordinate system conversion necessary for robot control. The image generation unit 15 is a functional module that generates an operation image to be displayed in the monitor 120 from a frame image. The operation image is an image visually recognized by the user. The image generation unit 15 may generate the operation image from the first or second frame image. In some examples, the image generation unit 15 generates the operation image from first frame image.

In some examples, the image generation unit 15 includes a direction information generation unit 16 and a delay information generation unit 17 as functional modules for generating the operation image. The direction information generation unit 16 is a functional module that generates direction information indicating the motion direction of the robot 2 in the first frame image. The delay information generation unit 17 is a functional module that generates delay information indicating a delay of the motion of the robot 2 with respect to the command to the robot 2.

Coordinate System Conversion

Figure 4:
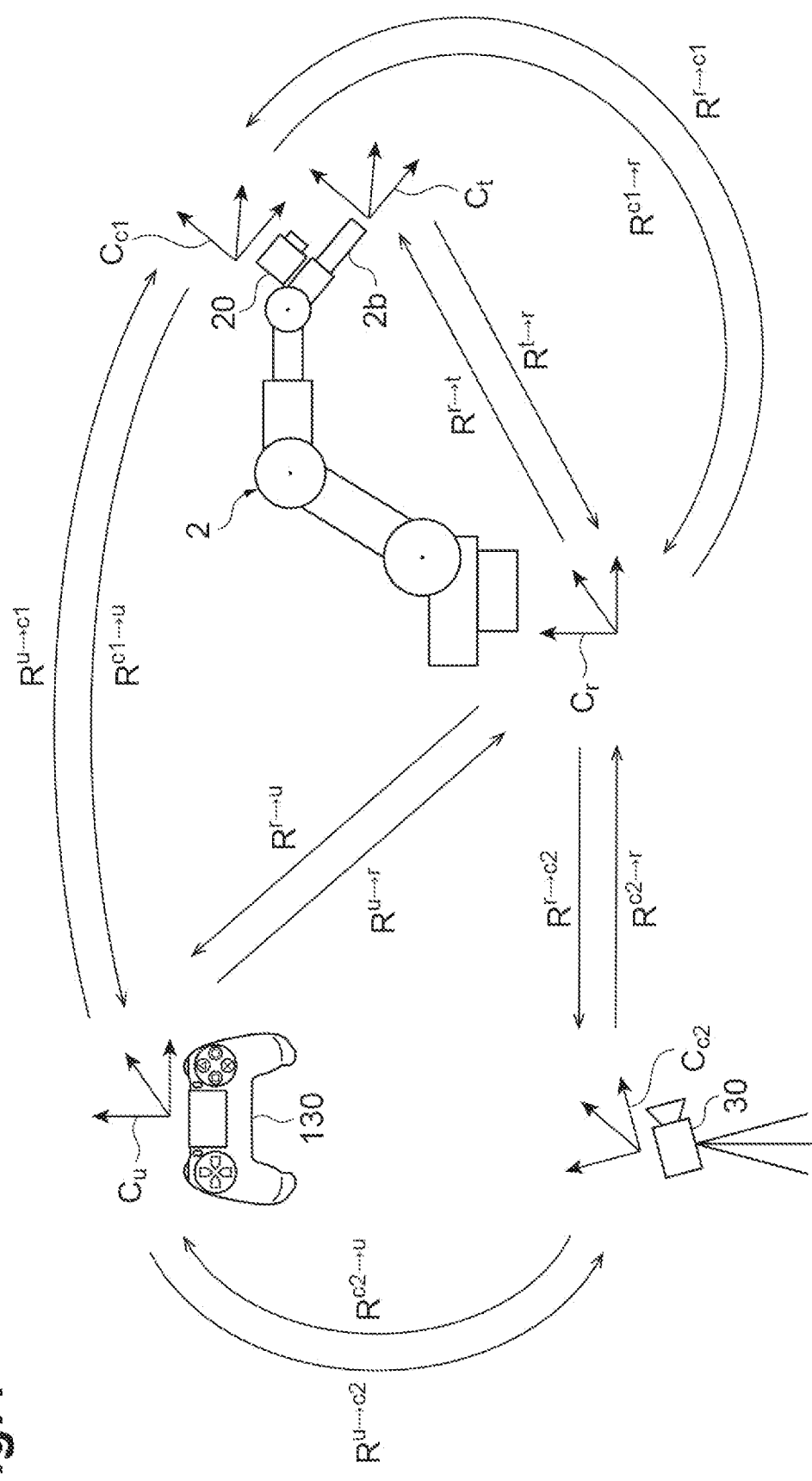
FIG. 4 is a diagram showing an example of coordinate system conversion.

The coordinate system conversion will be described with reference to FIG. 4. FIG. 4 is a diagram showing an example coordinate system conversion (coordinate conversion) in the robot control system 1. The robot control system 1 may include a controller coordinate system $C_u$ corresponding to the direction input from the input device 130, a robot coordinate system $C_r$ corresponding to the posture of the robot 2, a tool coordinate system $C_t$ corresponding to the posture of the end effector 2b, a first camera coordinate system $C_{c1}$ corresponding to the posture of the hand camera 20, and a second camera coordinate system $C_{c2}$ corresponding to the posture of the bird's eye view camera 30.

The coordinate system conversion (in some examples, conversion of position and direction between coordinate systems) can be represented by a matrix R. In FIG. 4, A matrix $Ru^{u->c1}$ represents conversion from the controller coordinate system $C_u$ to the first camera coordinate system $C_{c1}$, and the matrix $R^{c1->u}$ represents conversion from the first camera coordinate system $C_{c1}$ to the controller coordinate system $C_u$. A matrix $R^{u->r}$ represents conversion from the controller coordinate system $C_u$ to the robot coordinate system $C_r$, and a matrix $R^{r->u}$ represents conversion from the robot coordinate system $C_r$ to the controller coordinate system $C_u$. A matrix $Ru^{u->c2}$ represents conversion from the controller coordinate system $C_u$ to the second camera coordinate system $C_{c2}$, and a matrix $R^{c2->u}$ represents conversion from the second camera coordinate system $C_{c2}$ to the controller coordinate system $C_u$. A matrix $R^{r->t}$ represents conversion from the robot coordinate system $C_r$ to the tool coordinate system $C_t$, and a matrix $R^{t->r}$ represents conversion from the tool coordinate system $C_t$ to the robot coordinate system $C_r$. A matrix $R^{r->c1}$ represents conversion from the robot coordinate system $C_r$ to the first camera coordinate system $C_{c1}$, and a matrix $R^{c1->r}$ represents conversion from the first camera coordinate system $C_{c1}$ to the robot coordinate system $C_r$. A matrix $R^{r->c2}$ represents conversion from the robot coordinate system $C_r$ to the second camera coordinate system $C_{c2}$, and a matrix $R^{c2->r}$ represents conversion from the second camera coordinate system $C_{c2}$ to the robot coordinate system $C_r$.

Since the hand camera 20 is installed on the robot 2, the first camera coordinate system $C_{c1}$ may be regarded as identical or substantially identical to the robot coordinate system $C_r$ or the tool coordinate system $C_t$. In this case, the conversion between these coordinate systems may be omitted.

A certain matrix R can be replaced by a combination of other matrices R. For example, the matrix $R^{u->c1}$ is replaced by a combination of the matrix $R^{u->c2}$, the matrix $R^{c2->r}$, and the matrix $R^{r->c1}$. This replacement is represented by $R^{u->c1} = R^{r->c1} R^{c2->r} R^{u->c2}$.

The user operation may be performed based on any coordinate system. For example, the user may operate the robot 2 while viewing a moving image composed of the operation images or a moving image captured by the bird's eye view camera 30. The command generation unit 12 outputs a command based on the coordinate system. In this case, the coordinate conversion unit 14 performs the conversion from the first camera coordinate system $C_{c1}$ or the second camera coordinate system $C_{c2}$ to the robot coordinate system $C_r$ to generate a command in the robot coordinate system $C_r$, and transmits the converted command to the robot computer 3. In some examples, since the operating device 10 includes the coordinate conversion unit 14, the coordinate system conversion can be executed without being affected by the delay.

Robot Control Method

Figure 5:
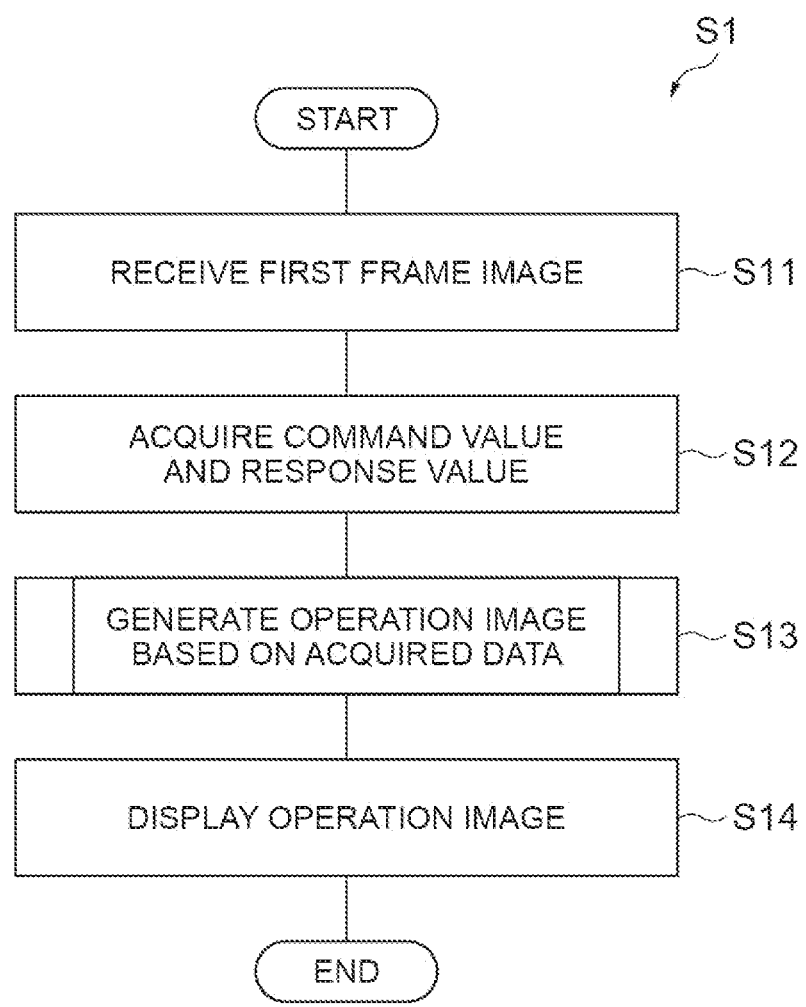
FIG. 5 is a flowchart showing an example operation of the robot control system.

As some examples of the robot control method according to the present disclosure, an example of a series of processing procedures executed by the robot control system 1 will be described with reference to FIG. 5. FIG. 5 is a flowchart showing an example operation of the robot control system 1 as a processing flow S1. That is, the robot control system 1 executes the processing flow S1. The processing flow S1 represents a process of generating one operation image by processing one first frame image obtained from the hand camera 20. In response to the hand camera 20 sequentially generating the first frame images over time, the robot control system 1 sequentially processes the first frame images to generate a series of operation images. Therefore, the processing flow S1 is repeatedly executed. By the repetitive processing, a moving image composed of a series of the operation images is obtained.

In step S11, the image receiving unit 11 receives the first frame image. In the work environment Ew, the hand camera 20 outputs the first frame image to the robot computer 3, and the robot computer 3 transmits the first frame image to the operating device 10 via the communication network N. The first frame image may represent at least a part of the end effector 2b. Since the position or posture of the hand camera 20 changes in accordance with the motion of the robot 2, a capture position of the first frame image also changes in accordance with the motion of the robot 2. The capture position refers to a position or range of a region that is captured and recorded by the first frame image (hand camera 20).

In step S12, the data acquisition unit 13 acquires a command value and a response value. The data acquisition unit 13 acquires the command value generated by the command generation unit 12 and receives the response value transmitted from the robot computer 3. For example, the response value may be information indicating the motion (position or posture) of the robot 2 or may be the command value output from the robot controller 4 to the robot 2.

Figure 6:
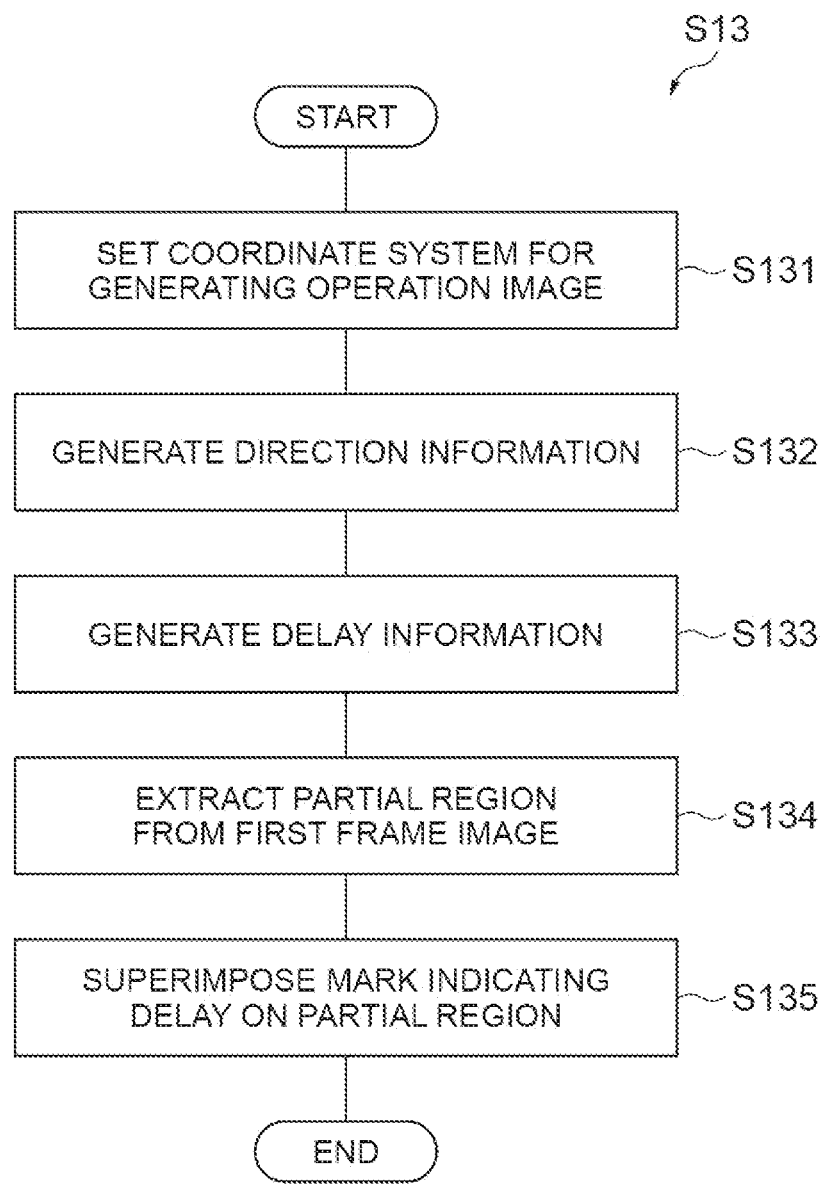
FIG. 6 is a diagram showing an example processing of generating an operation image.

In step S13, the image generation unit 15 generates an operation image based on the acquired data. An example of the generation process will be described with reference to FIG. 6. FIG. 6 is a flowchart showing an example processing of generating the operation image.

In step S131, the coordinate conversion unit 14 sets a coordinate system for generating the operation image. In some examples, the coordinate conversion unit 14 sets the coordinate system associated with the hand camera 20 that generates the first frame image, for the generation of the operation image. The coordinate conversion unit 14 may set the first camera coordinate system $C_{c1}$ as a coordinate system associated with the hand camera 20. In a case where the first camera coordinate system $C_{c1}$ can be regarded as identical or substantially identical to the robot coordinate system $C_r$ or the tool coordinate system $C_t$, the coordinate conversion unit 14 may set the robot coordinate system $C_r$ or the tool coordinate system $C_t$ as the coordinate system associated with the hand camera 20.

The coordinate conversion unit 14 executes a conversion from other coordinate system to the coordinate system associated with the hand camera 20 for the setting, if necessary. For example, in a case where a user operation based on a moving image (i.e., a series of the second frame images) from the bird's eye view camera 30 is performed, the coordinate conversion unit 14 may convert a coordinate system (e.g., the robot coordinate system $C_r$ or second camera coordinate system $C_{c2}$) corresponding to a command generated by the command generation unit 12 into a coordinate system (e.g., the first camera coordinate system $C_{c1}$, robot coordinate system $C_r$, or tool coordinate system $C_t$) associated with a command associated with the hand camera 20. The coordinate conversion unit 14 sets the converted coordinate system for the generation of the operation image.

In step S132, the direction information generation unit 16 generates direction information. The direction information generation unit 16 identifies a motion direction of the robot 2 in the first frame image according to the coordinate system set by the coordinate conversion unit 14, and generates the direction information indicating the motion direction. In a case where the motion direction of the robot 2 in the three dimensional space is replaced with the motion direction of the robot 2 on the first frame image, the motion direction on the first frame image is defined by a combination of at least one of the horizontal direction, the vertical direction, the depth direction, and the rotation direction. For example, the direction information generation unit 16 generates the direction information indicating at least one of the horizontal direction and the vertical direction as the motion direction. Alternatively, the direction information generation unit 16 generates the direction information representing at least the depth direction, as the motion direction. Alternatively, the direction information generation unit 16 generates the direction information representing at least the rotation direction, as motion direction.

In step S133, the delay information generation unit 17 generates delay information. The delay information generation unit 17 generates the delay information based on the command generated by the command generation unit 12 and the response of the robot 2 obtained from the robot computer 3. In some examples, the delay information generation unit 17 generates the delay information based on a difference between the command value output from the command generation unit 12 to the robot computer 3 (or the robot controller 4) and the response value indicating the motion (response) of the robot 2 with respect to the command value. For example, the delay information generation unit 17 may generate the delay information indicating the difference. In some examples, the delay information generation unit 17 may use a difference between the integral value of the command values and the integral value of the response values as the difference between the command value and the response value.

In step S134, the image generation unit 15 extracts a partial region from the first frame image according to the command generated by the command generation unit 12. The partial region refers to a partial area of the first frame image. The image generation unit 15 sets the partial region corresponding to the command in accordance with the coordinate system converted by the coordinate conversion unit 14. In some examples, the image generation unit 15 sets at least one of the position and dimension of the partial region such that the partial region represents the delay of the motion of the robot 2 with respect to the command. The image generation unit 15 then trims the first frame image based on the setting to extract the partial region. For example, the image generation unit 15 trims an entire peripheral region of the first frame image based on at least one of the set position and dimension, and extracts the remaining region (inner region) as the partial region. The entire peripheral region refers to a region including the entire outer edge. A maximum width of the region to be removed by the trimming may be set in advance. The removed region is not used for the operation image and is therefore not visible to the user.

In some examples, the image generation unit 15 extracts the partial region such that at least a part of the end effector 2*b* appears in the partial region (in some examples, such that at least a part of the end effector 2*b* is included in the partial region).

In step S135, the image generation unit 15 superimposes a mark (or delay mark) indicating the delay on the partial region to generate the operation image. In the present disclosure, the mark refers to a display for allowing a person to visually recognize some information. The "mark indicating the delay" (or delay mark) is a display for allowing the user to visually recognize the delay. In some examples, the image generation unit 15 superimposes a reference mark and a virtual mark on a partial region as marks indicating the delay (or as delay marks).

The reference mark is a mark whose position is fixed to the frame image (in some examples, the first frame image) and which represents a reference point of the robot 2. The fact that "the position is fixed to the frame image (first frame image)" refers to the fact that the position of the reference mark in the frame image (first frame image) is determined in advance and the position does not change. The "reference point of robot" refers to a point that is recognized as a reference of the robot 2 in a case where the robot 2 is viewed through the frame image (first frame image). That is, the "reference point of robot" is the reference point of the robot in the frame image (first frame image). In some examples, the image generation unit 15 sets the center of the first frame image as the position of the reference mark.

The virtual mark is a mark whose position is fixed to the operation image and which is provided to represent the delay. The fact that "the position is fixed to the operation image" refers to that fact that the position of the virtual mark in the operation image is determined in advance and the position does not change. In some examples, the image generation unit 15 sets the center of the partial region as the position of the virtual mark. Alternatively, the image generation unit 15 may set the virtual mark at a working point of the end effector 2*b* or at a position associated with the working point. Displaying the virtual mark at the position related to the working point makes the robot operation easier (improves operability of the robot).

The mark may be represented by a point, a cross, an arrow, a bar, or a shadow (silhouette) of the end effector appearing in the partial region. The reference mark and the virtual mark may be expressed in the same manner or in different manners. The reference mark and the virtual mark may have the same shape and dimension. By matching the shape and dimension between the two types of marks, it is more clearly expressed whether the delay occurs, which may contribute to an improvement in the operability.

In order to set the position of the reference mark on the partial region, the image generation unit 15 sets at least one of the position and dimension of the partial region with respect to the first frame image. This setting is a process of shifting the position of the partial region extracted from the first frame image, from the original position, a process of enlarging or reducing the dimension of the partial region from the original dimension, or a process of changing both the position and dimension. The image generation unit 15 sets at least one of the position and dimension of the partial region with respect to the first frame image in accordance with at least one of the direction information and the delay information.

In a case where the direction information indicates at least one of the horizontal direction and vertical direction on the first frame image as the motion direction, the image generation unit 15 translates the partial region with respect to the first frame image in accordance with the direction information to set the position of the partial region. In a case where the direction information indicates the depth direction on the first frame image as the motion direction, the image generation unit 15 scales the partial region with respect to the first frame image according to the direction information to set the dimension of the partial region. In a case where the direction information indicates the rotation direction on the first frame image as the motion direction, the image generation unit 15 rotates the partial region with respect to the first frame image in accordance with the direction information to set the position of the partial region.

For at least one of an amount (amount of movement) by which the position of the partial region is moved with respect to the first frame image and an amount (amount of scaling) by which the dimension of the partial region is changed with respect to the first frame image, the image generation unit 15 may set the amount in accordance with the delay information. That is, the image generation unit 15 may set at least one of the position and dimension of the partial region with respect to the first frame image in accordance with the delay information.

For example, the image generation unit 15 sets the position or dimension of the partial region based on the amount of shift corresponding to the delay information. In some examples, the image generation unit 15 converts the difference indicated by the delay information (i.e., the difference between the command value and the response value) into the number of pixels in the first frame image. Referring to a coefficient for the conversion as a gain, the image generation unit 15 obtains a product of the difference and a given gain as the amount of shift. The image generation unit 15 sets the position or dimension of the partial region in accordance with the amount of shift.

Alternatively, the image generation unit 15 may set a fixed value for at least one of the amount of movement and the amount of scaling. For example, the image generation unit 15 may set a maximum width of the region to be removed when extracting the partial region from the frame image, as at least one of the amount of movement and the amount of scaling. The image generation unit 15 may set the amount of movement or amount of scaling to a given maximum change amount in a case where the amount of movement or amount of scaling is greater than the maximum width, and otherwise set the amount of movement or amount of scaling according to the amount of shift.

The image generation unit 15 superimposes the reference mark and the virtual mark on the partial region whose position or dimension is set with respect to the first frame image. That is, the image generation unit 15 draws the reference mark and virtual mark on the partial region. By this processing, the image generation unit 15 generates the operation image so as to represent the delay. Since the position of the reference mark is fixed to the first frame image as described above, the position of the reference mark on the partial region changes according to at least one of the position and dimension of the partial region with respect to the first frame image. In some examples, the amount of shift or the amount of scaling of the partial region with respect to the first frame image increases as the delay increases. In a case where there is no delay, the image generation unit 15 superimposes the virtual mark and the reference mark on the partial region such that these marks overlap each other. In this case, it is not necessary to completely match the virtual mark and the reference mark. For example, in order to make the two marks visible even in a case where the amount of shift is 0, the image generation unit 15 may slightly shift the positions of the two marks or may make the shape or dimension of one mark different from the shape or dimension of the other mark. The "case where there is no delay" refers to the fact that the difference between the command value and the response value is low to such an extent that the user does not perceive an influence of the delay or the influence can be ignored. For example, the "case where there is no delay" refers to the fact that the difference is 0, or equal to or less than a predetermined threshold value.

Returning to FIG. 5, in step S14, the image generation unit 15 displays the operation image on the monitor 120. In some examples, the image generation unit 15 displays the operation image on the monitor 120, so as to represent the delay of the motion of the robot 2 with respect to the command. The user can grasp the degree of delay at this time by visually recognizing the mark (for example, the reference mark and the virtual mark) on the operation image.

Figure 7:
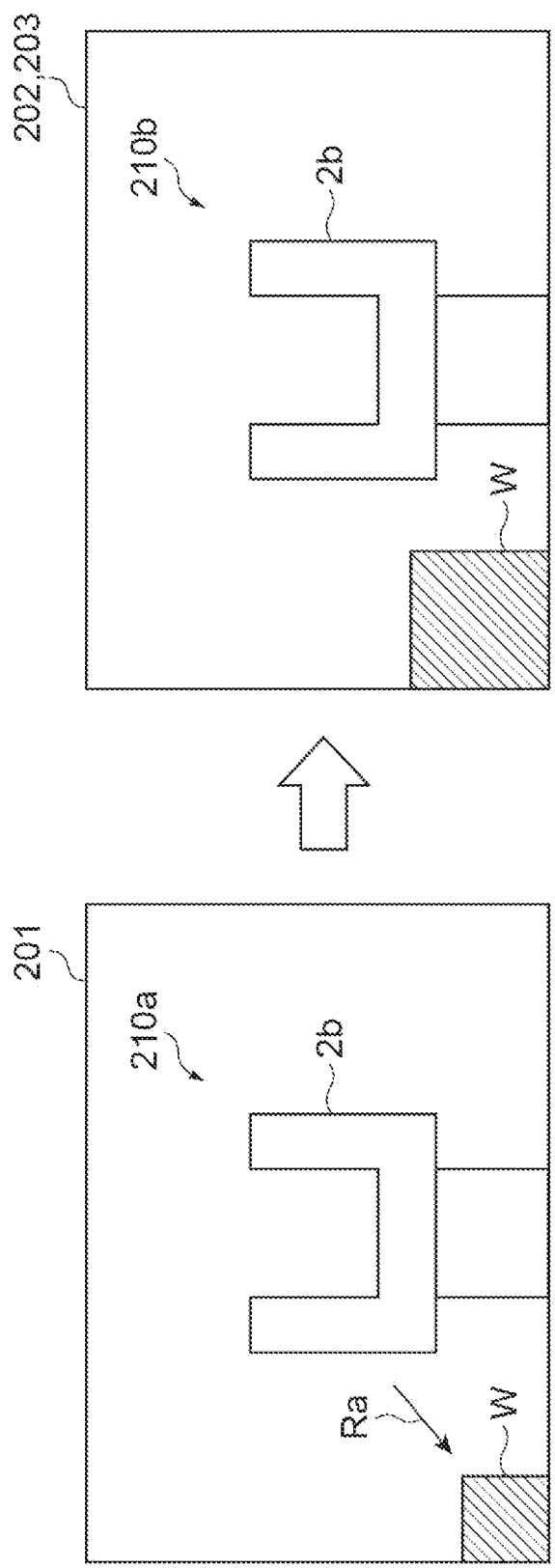
FIG. 7 is a diagram showing an example change of a frame image (first frame image).
Figure 8:
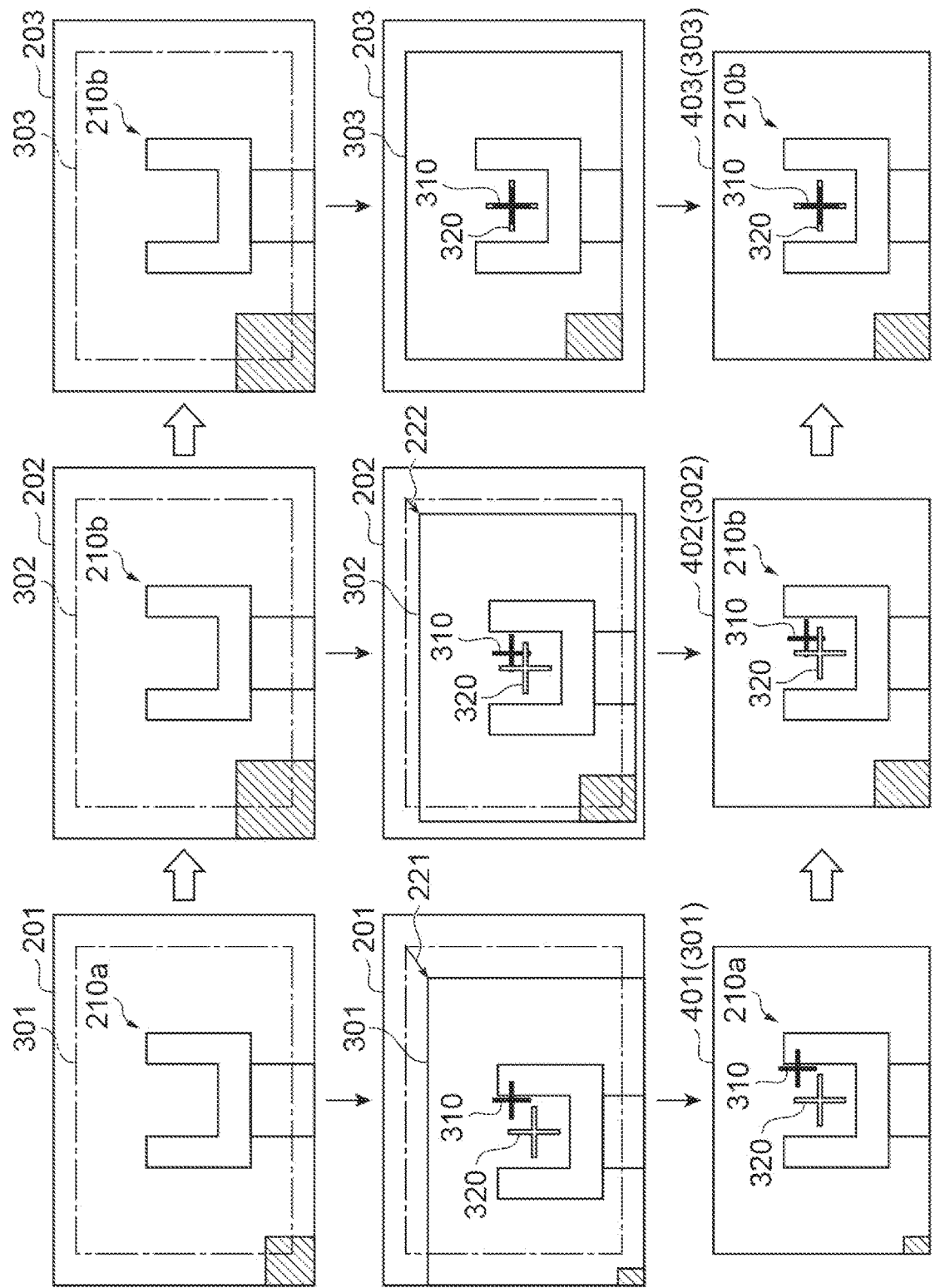
FIG. 8 is a diagram showing an example change of an operation image, corresponding to FIG. 7.

An example of generation of the operation image will be described with reference to FIGS. 7 and 8. FIG. 7 is a diagram showing an example change of the first frame image. FIG. 8 is a diagram showing an example change of the operation image, and corresponds to FIG. 7.

FIG. 7 shows a scene in which the user moves the end effector 2b along a direction Ra in the first frame image in order to bring the end effector 2b closer to a workpiece W. It is assumed in this case that the user moves the end effector 2b along the direction Ra in a situation 210a and stops the operation in a situation 210b. In response to the operation, the image receiving unit 11 first receives the first frame image 201 representing the situation 210a, and then receives the first frame image 202 and the first frame image 203, both of which represent the situation 210b, in this order.

The processing of the first frame image 201 will be described with reference to FIG. 8. In accordance with the coordinate system set by the coordinate conversion unit 14, the direction information generation unit 16 generates the direction information (i.e., the direction Ra) indicating the motion direction of the robot 2 in the first frame image 201. In this example, it is assumed that the direction Ra is a combination of the horizontal direction and the vertical direction in the first frame image 201. The delay information generation unit 17 generates the delay information based on a command for moving the end effector 2b along the direction Ra and a response of the robot 2. The image generation unit 15 extracts a partial region 301 from the first frame image 201 in response to the command. The image generation unit 15 translates the partial region 301 with respect to the first frame image 201 and sets the position of the partial region 301 with respect to the first frame image 201. In FIG. 8, the translation is indicated by a vector 221. The image generation unit 15 superimposes a reference mark 310 and a virtual mark 320 on the partial region 301 to generate an operation image 401 representing the situation 210a. In the example of FIG. 8, it is assumed that the image generation unit 15 superimposes the reference mark 310 on the center of the first frame image and superimposes the virtual mark 320 on the center of the partial region. The delay is expressed by a difference between the position of the reference mark 310 and the position of the virtual mark 320. The difference is represented by the direction and magnitude (i.e., the vector 221) of the movement of the partial region 301 relative to the first frame image 201.

Next, the processing of the first frame image 202 will be described. As in the case of the first frame image 201, the direction information generation unit 16 generates the direction information indicating the direction Ra, and the delay information generation unit 17 generates the delay information. The image generation unit 15 sets the position of a partial region 302 with respect to the first frame image 202 in accordance with the direction information and the delay information. In this case as well, the image generation unit 15 translates the partial region 302 with respect to the first frame image 202 and sets the position of the partial region 302 with respect to the first frame image 202. The image generation unit 15 superimposes the reference mark 310 and the virtual mark 320 on the partial region 302 to generate an operation image 402 representing the situation 210b. As the delay decreases, the difference between the position of the reference mark 310 and the position of the virtual mark 320 decreases. In the example of FIG. 8, the decrease of the difference is indicated by a vector 222 the indicating the translation of the partial region 302.

In a case where the delay disappears (that is, when the difference between the command value and the response value becomes 0, or equal to or less than the predetermined threshold), the reference mark 310 and the virtual mark 320 overlap each other. In the example of FIG. 8, as it turned out, the image generation unit 15 does not change the position and dimension of a partial region 303 extracted from the first frame image 203. The image generation unit 15 therefore superimposes the reference mark 310 and the virtual mark 320 on the partial region 303 such that these marks overlap each other, and generates a operation image 403 representing the situation 210b.

As shown in FIG. 8, the operating device 10 displays the position difference between the reference mark 310 and the virtual mark 320 in real time. The user can therefore grasp the degree of delay in real time, and as a result, can operate the robot 2 without feeling much stress.

Program

Each functional module of the operating device 10 is realized by reading a robot control program on the processor 161 or the memory 162 and causing the processor 161 to execute the program. The robot control program includes code for implementing each functional module of the operating device 10. The processor 161 operates the input/output port 164 or the communication port 165 in accordance with the robot control program, and reads and writes data in the memory 162 or the storage 163. Each functional module of the operating device 10 is realized by such processing.

The robot control program may be provided after being fixedly recorded in a non-transitory storing medium such as a CD-ROM, a DVD-ROM, or a semiconductor memory. Alternatively, the robot control program may be provided via a communication network as data signals superimposed on a carrier wave.

As described above, a robot control system according to an aspect of the present disclosure includes circuitry configured to: generate a command to a robot; receive a frame image in which a capture position changes according to a motion of the robot based on the command; extract a partial region from the frame image according to the command; superimpose a delay mark on the partial region to generate an operation image; and display the operation image on a display device, so as to represent a delay of the motion of the robot with respect to the command.

A robot control method according to an aspect of the present disclosure is executable by a robot control system including at least one processor. The method includes: generating a command to a robot; receiving a frame image in which a capture position changes according to a motion of the robot based on the command; extracting a partial region from the frame image according to the command;

superimposing a delay mark on the partial region to generate an operation image; and displaying the operation image on a display device, so as to represent a delay of the motion of the robot with respect to the command.

Anon-transitory computer-readable storage medium according to an aspect of the present disclosure stores processor-executable instructions to: generate a command to a robot; receive a frame image in which a capture position changes according to a motion of the robot based on the command; extract a partial region from the frame image according to the command; superimpose a delay mark on the partial region to generate an operation image; and display the operation image on a display device, so as to represent a delay of the motion of the robot with respect to the command.

In these aspects, since not the entire frame image but only a part of the frame image is used as the operation image, it is possible to absorb or reduce the influence of the delay on the frame image and to allow a user to intuitionally grasp the motion of the robot. This mechanism can assist the operation of the robot. Since the user can accurately operate the robot while viewing the operation image, improvement in work efficiency can be expected.

In some examples, the circuitry may be configured to superimpose, on the partial region, a virtual mark which is fixed in position to the operation image and provided to represent the delay, as at least part of the delay mark. By the virtual mark, the delay can be represented such that the user can intuitionally grasp the degree of delay.

In some examples, the circuitry may be configured to set a center of the partial region as a position of the virtual mark.

In some examples, the circuitry may be configured to set the virtual mark at a position corresponding to a working point of an end effector of the robot.

In some examples, the circuitry may be configured to superimpose, on the partial region, a reference mark which is fixed in position to the frame image and represents a reference point of the robot, as at least part of the delay mark. By the reference mark, the delay can be represented such that the user can intuitionally grasp the degree of delay.

In some examples, the circuitry may be configured to set a center of the frame image as a position of the reference mark.

In some examples, the circuitry may be configured to superimpose the virtual mark and the reference mark on the partial region such that the virtual mark and the reference mark overlap each other in a case where there is no delay. Since the positional relationship between the virtual mark and the reference mark represents whether or not the delay exists, the user can intuitionally grasp the degree of delay.

In some examples, the circuitry may be configured to: generate direction information representing a motion direction of the robot in the frame image, based on the command; and set at least one of a position and a dimension of the partial region with respect to the frame image, in accordance with the direction information. By setting the partial region according to the motion direction of the robot, the delay is represented in a manner that the delay and the motion of the robot are associated with each other. It is therefore possible to provide the user with an environment to operate the robot more easily.

In some examples, the circuitry may be configured to: generate the direction information representing at least one of a horizontal direction and a vertical direction as the motion direction, and translate the partial region with respect to the frame image in accordance with the direction information, to set the position of the partial region. In this case, since the delay is represented in association with the motion of the robot including the movement along the horizontal direction or the vertical direction, the robot operation along that direction can be made easier.

In some examples, the circuitry may be configured to: generate the direction information representing at least a depth direction as the motion direction, and scale the partial region with respect to the frame image according to the direction information, to set the dimension of the partial region. In this case, since the delay is represented in association with the motion of the robot including the movement along the depth direction, the robot operation along that direction can be made easier.

In some examples, the circuitry may be configured to: generate the direction information representing at least a rotation direction as the motion direction, and rotate the partial region with respect to the frame image according to the direction information, to set the position of the partial region. In this case, since the delay is represented in association with the motion of the robot including the movement along the rotation direction, the robot operation along that direction can be made easier.

In some examples, the circuitry may be configured to trim an entire peripheral region of the frame image to extract a remaining region of the frame image as the partial region, based on at least one of the set position and the set dimension.

In some examples, the circuitry may be configured to: generate delay information corresponding to the delay, based on the command and a response of the robot; and set at least one of a position and a dimension of the partial region with respect to the frame image in accordance with the delay information. By setting the partial region based on the command and the response of the robot, an operation image corresponding to the degree of delay is generated. This operation image makes the robot operation easier.

In some examples, the circuitry may be configured to: generate the delay information based on, as the command and the response of the robot, a difference between a command value output to a robot controller that controls the robot and a response value indicating the motion of the robot according to the command value; and set the position or the dimension of the partial region based on an amount of shift corresponding to the delay information. By setting the partial region in accordance with the amount of shift, an operation image reflecting the degree of delay is generated. This operation image makes the robot operation easier.

In some examples, the circuitry may be configured to generate the delay information based on the difference between the integral value of the command value and the integral value of the response value.

In some examples, the robot control system may further include: a robot controller configured to control the robot based on the command; and an operating device connected to the robot controller through a communication network and including the circuitry and the display device. The circuitry may be further configured to generate the command in response to a user operation. By this configuration, it is possible to absorb or reduce the influence of the delay generated by the remote operation of the robot, and to allow the user to intuitionally grasp the motion of the remotely located robot.

In some examples, the robot control system may further include: a first camera provided on a distal side of the robot such that at least one of a position and a posture changes according to the motion of the robot, and generating a first frame image; and a second camera configured to generate a second frame image representing at least part of the robot at a position and a posture independent of the motion of the robot. The circuitry may be further configured to: convert a coordinate system corresponding to the generated command into a coordinate system corresponding to a command related to the first camera in a case where a user operation based on the second frame image is performed; and set the partial region according to the converted coordinate system. By this configuration, even in a case where an operation is performed based on an image from a camera independent of the motion of a robot, an operation image is generated while absorbing a difference between coordinate systems. Therefore, even in that case, the user can intuitively grasp the motion of the robot.

In some examples, the robot may include an end effector, the frame image may represent the end effector, and the circuitry may be further configured to extract the partial region such that the end effector is included. Since the operation image represents the end effector, the user can operate the robot more easily.

Additional Examples

It is to be understood that not all aspects, advantages and features described herein may necessarily be achieved by, or included in, any one particular example. Indeed, having described and illustrated various examples herein, it should be apparent that other examples may be modified in arrangement and detail is omitted.

Although the operating device 10 includes the coordinate conversion unit 14 in the above examples, at least a part of the coordinate system conversion may be executed by another device. For example, the robot computer 3 or the robot controller 4 may perform at least a part of the coordinate system conversion.

The robot computer 3 is not an essential component. In this case, each of the robot controller 4, the hand camera 20, and the bird's eye view camera 30 may be more directly connected to the operating device 10 via the communication network N.

The hardware configuration of the system is not limited to an example in which each functional module is implemented by executing a program. For example, at least part of the functional modules in the above-described examples may be configured by logic circuitry specialized for the function(s), or may be configured by an application specific integrated circuit (ASIC) in which the logic circuitry is integrated.

A procedure of the method executed by at least one processor is not limited to the above examples. For example, some of the above-described steps (processes) may be omitted, or the steps may be executed in a different order. Furthermore, any two or more steps among the above-described steps may be combined, or part of the steps may be modified or deleted. Alternatively, other steps may be executed in addition to the steps described above.

In a case where a magnitude relationship between two numerical values is compared in a computer system or a computer, either of two criteria of "equal to or greater than" and "greater than" may be used, and either of two criteria of "equal to or less than" and "less than" may be used.

We claim all modifications and variations coining within the spirit and scope of the subject matter claimed herein.

Regarding the above examples, the following appendices are provided by way of further illustration.

(Appendix 1) A robot control system comprising:
a receiving unit configured to receive a frame image in which a capture position changes according to a motion of a robot operating based on a command;
a command generation unit configured to generate the command; and
an operation image generation unit configured to extract a partial region from the frame image according to the command to generate an operation image, so as to represent a delay of the motion of the robot with respect to the command.

(Appendix 2) The robot control system according to appendix 1, wherein the operation image generation unit is configured to superimpose, on the partial region, a virtual mark which is fixed in position to the operation image and provided to represent the delay, to generate the operation image.

(Appendix 3) The robot control system according to appendix 2, wherein the operation image generation unit is configured to superimpose, on the partial region, a reference mark which is fixed in position to the frame image and represents a reference point of the robot, to generate the operation image.

(Appendix 4) The robot control system according to appendix 3, wherein the operation image generation unit is configured to superimpose the virtual mark and the reference mark on the partial region such that the virtual mark and the reference mark overlap each other in a case where there is no delay.

(Appendix 5) The robot control system according to any one of appendices 1 to 4, further comprising:
a direction information generation unit configured to generate direction information representing a motion direction of the robot in the frame image, based on the command,
wherein the operation image generation unit is configured to set at least one of a position and a dimension of the partial region with respect to the frame image, in accordance with the direction information.

(Appendix 6) The robot control system according to appendix 5, wherein
the direction information generation unit is configured to generate the direction information representing at least one of a horizontal direction and a vertical direction as the motion direction, and
the operation image generation unit is configured to translate the partial region with respect to the frame image in accordance with the direction information, to set the position of the partial region.

(Appendix 7) The robot control system according to appendix 5 or 6, wherein
the direction information generation unit is configured to generate the direction information representing at least a depth direction as the motion direction, and
the operation image generation unit is configured to scale the partial region with respect to the frame image according to the direction information, to set the dimension of the partial region.

(Appendix 8) The robot control system according to any one of appendices 5 to 7, wherein
the direction information generation unit is configured to generate the direction information representing at least a rotation direction as the motion direction, and
the operation image generation unit is configured to rotate the partial region with respect to the frame image according to the direction information, to set the position of the partial region.

(Appendix 9) The robot control system according to any one of appendices 1 to 8, further comprising:
a delay information generation unit configured to generate delay information corresponding to the delay, based on the command and a response of the robot,
wherein the operation image generation unit is configured to set at least one of a position and a dimension of the partial region with respect to the frame image in accordance with the delay information.

(Appendix 10) The robot control system according to appendix 9, wherein
the delay information generation unit is configured to generate the delay information based on, as the command and the response of the robot, a difference between a command value output by the command generation unit to a robot controller that controls the robot and a response value indicating the motion of the robot according to the command value, and
the operation image generation unit is configured to set the position or the dimension of the partial region based on an amount of shift corresponding to the delay information.

(Appendix 11) The robot control system according to any one of appendices 1 to 10, further comprising:
a robot controller configured to control the robot based on the command; and
an operating device connected to the robot controller through a communication network and including the receiving unit, the command generation unit, the operation image generation unit, and a display unit configured to display the operation image,
wherein the command generation unit generates the command in response to a user operation.

(Appendix 12) The robot control system according to any one of appendices 1 to 11, further comprising:
a first camera provided on a distal side of the robot such that at least one of a position and a posture changes according to the motion of the robot, and generating a first frame image;
a second camera configured to generate a second frame image representing at least part of the robot at a position and a posture independent of the motion of the robot; and
a coordinate conversion unit configured to convert a coordinate system corresponding to the command generated by the command generation unit into a coordinate system corresponding to a command related to the first camera in a case where a user operation based on the second frame image is performed,
wherein the operation image generation unit is configured to set the partial region according to the coordinate system converted by the coordinate conversion unit.

(Appendix 13) The robot control system according to any one of appendices 1 to 12, wherein
the robot comprises an end effector,
the frame image represents the end effector, and
the operation image generation unit extracts the partial region such that the end effector is included.

(Appendix 14) A robot control method executed by a robot control system including at least one processor, the method comprising:
receiving a frame image in which a capture position changes according to a motion of a robot operating based on a command;
generating the command; and
extracting a partial region from the frame image according to the command to generate an operation image, so as to represent a delay of the motion of the robot with respect to the command.

(Appendix 15) A robot control program for causing a computer to execute:
receiving a frame image in which a capture position changes according to a motion of a robot operating based on a command;
generating the command; and
extracting a partial region from the frame image according to the command to generate an operation image, so as to represent a delay of the motion of the robot with respect to the command.

What is claimed is:

1. A robot control system comprising circuitry configured to:
generate a command to a robot;
receive a frame image in which a capture position changes according to a motion of the robot based on the command;
extract a partial region from the frame image according to the command;
set a center of the partial region as a fixed position of a virtual mark which is provided to represent a delay of the motion of the robot with respect to the command;
superimpose, as at least part of a delay mark, the virtual mark on the partial region to generate an operation image, wherein the virtual mark is fixed in position to the operation image; and
display the operation image on a display device, so as to represent the delay of the motion of the robot.

2. The robot control system according to claim 1, wherein the circuitry is configured to set a working point of an end effector of the robot as the fixed position of the virtual mark.

3. The robot control system according to claim 1, wherein the circuitry is configured to superimpose, on the partial region, a reference mark which is fixed in position to the frame image and represents a reference point of the robot, as at least part of the delay mark.

4. The robot control system according to claim 3, wherein the circuitry is configured to set a center of the frame image as a fixed position of the reference mark.

5. The robot control system according to claim 4, wherein the circuitry is configured to superimpose the virtual mark and the reference mark on the partial region such that the virtual mark and the reference mark overlap each other in a case where there is no delay.

6. The robot control system according to claim 1, wherein the circuitry is configured to:
generate direction information representing a motion direction of the robot in the frame image, based on the command; and
set at least one of a position and a dimension of the partial region with respect to the frame image, in accordance with the direction information.

7. The robot control system according to claim 6, wherein the circuitry is configured to:
generate the direction information representing at least one of a horizontal direction and a vertical direction as the motion direction, and
translate the partial region with respect to the frame image in accordance with the direction information, to set the position of the partial region.

8. The robot control system according to claim 6, wherein the circuitry is configured to:

generate the direction information representing at least a depth direction as the motion direction, and scale the partial region with respect to the frame image according to the direction information, to set the dimension of the partial region.

9. The robot control system according to claim 6, wherein the circuitry is configured to:

generate the direction information representing at least a rotation direction as the motion direction, and rotate the partial region with respect to the frame image according to the direction information, to set the position of the partial region.

10. The robot control system according to claim 6, wherein the circuitry is configured to trim an entire peripheral region of the frame image to extract a remaining region of the frame image as the partial region, based on at least one of the set position and the set dimension.

11. The robot control system according to claim 1, wherein the circuitry is configured to:

generate delay information corresponding to the delay, based on the command and a response of the robot; and set at least one of a position and a dimension of the partial region with respect to the frame image in accordance with the delay information.

12. The robot control system according to claim 11, wherein the circuitry is configured to:

generate the delay information based on, as the command and the response of the robot, a difference between a command value output to a robot controller that controls the robot and a response value indicating the motion of the robot according to the command value; and set the position or the dimension of the partial region based on an amount of shift corresponding to the delay information.

13. The robot control system according to claim 12, wherein the circuitry is configured to generate the delay information based on the difference between an integral value of the command value and an integral value of the response value.

14. The robot control system according to claim 1, further comprising:

a robot controller configured to control the robot based on the command; and an operating device connected to the robot controller through a communication network and including the circuitry and the display device, wherein the circuitry is further configured to generate the command in response to a user operation.

15. The robot control system according to claim 1, further comprising:

a first camera provided on a distal side of the robot such that at least one of a position and a posture of the first camera changes according to the motion of the robot, and generating a first frame image; and a second camera configured to generate a second frame image representing at least part of the robot at a position and a posture independent of the motion of the robot, wherein the circuitry is further configured to:

convert a coordinate system corresponding to the generated command into a coordinate system corresponding to a command related to the first camera in a case where a user operation based on the second frame image is performed; and set the partial region according to the converted coordinate system.

16. The robot control system according to claim 1, wherein the robot comprises an end effector, the frame image represents the end effector, and the circuitry is further configured to extract the partial region such that the end effector is included.

17. A robot control method executable by a robot control system including at least one processor, the method comprising:

generating a command to a robot;

receiving a frame image in which a capture position changes according to a motion of the robot based on the command;

extracting a partial region from the frame image according to the command;

setting a center of the frame image as a fixed position of a reference mark which is provided to represent a reference point of the robot;

superimposing, as at least part of a delay mark, the reference mark on the partial region to generate an operation image, wherein the reference mark is fixed in position to the frame image; and displaying the operation image on a display device, so as to represent a delay of the motion of the robot with respect to the command.

18. A non-transitory computer-readable storage medium storing processor-executable instructions to:

generate a command to a robot;

receive a frame image in which a capture position changes according to a motion of the robot based on the command;

extract a partial region from the frame image according to the command;

superimpose, as at least part of a delay mark, a virtual mark which is provided to represent a delay of the motion of the robot with respect to the command, on the partial region to generate an operation image, wherein the virtual mark is fixed in position to the operation image;

superimpose, as at least part of the delay mark, a reference mark which is fixed in position to the frame image and provided to represent a reference point of the robot, on the partial region, such that the virtual mark and the reference mark overlap each other in a case where there is no delay; and display the operation image on a display device, so as to represent the delay of the motion of the robot.

19. The storage medium according to claim 18, further storing processor-executable instructions to:

set a center of the partial region as a fixed position of the virtual mark; and set a center of the frame image as a fixed position of the reference mark.

20. The robot control method according to claim 17, further comprising:

setting a center of the partial region as a fixed position of a virtual mark which is fixed in position to the operation image and provided to represent the delay; and superimposing the virtual mark on the partial region, as at least part of the delay mark.

* * * * *